(12) United States Patent
Necci et al.

(10) Patent No.: US 10,160,536 B2
(45) Date of Patent: Dec. 25, 2018

(54) AIRCRAFT COMPRISING A RETRACTABLE ARM EQUIPPED WITH AN OBSTACLE DETECTOR

(71) Applicants: Safran Electronics & Defense, Boulogne-Billancourt (FR); MESSIER-BUGATTI-DOWTY, Velizy Villacoublay (FR)

(72) Inventors: Carlo Necci, Velizy Villacoublay (FR); Jacques Lacourie, Boulogne-Billancourt (FR)

(73) Assignees: SAFRAN ELECTRONICS & DEFENSE, Boulogne-Billancourt (FR); SAFRAN LANDING SYSTEMS, Velizy Villacoublay (FR)

( * ) Notice: Subject to any disclaimer, the term of this patent is extended or adjusted under 35 U.S.C. 154(b) by 127 days.

(21) Appl. No.: 15/304,040

(22) PCT Filed: Apr. 17, 2015

(86) PCT No.: PCT/EP2015/058383
§ 371 (c)(1),
(2) Date: Oct. 13, 2016

(87) PCT Pub. No.: WO2015/158892
PCT Pub. Date: Oct. 22, 2015

(65) Prior Publication Data
US 2017/0029095 A1    Feb. 2, 2017

(30) Foreign Application Priority Data
Apr. 17, 2014    (FR) ..................... 14 53516

(51) Int. Cl.
B64C 25/00    (2006.01)
B64D 47/08    (2006.01)
B64C 25/10    (2006.01)

(52) U.S. Cl.
CPC ............ *B64C 25/001* (2013.01); *B64C 25/10* (2013.01); *B64D 47/08* (2013.01)

(58) Field of Classification Search
CPC ........ B64C 25/001; B64C 25/10; B64D 47/08
See application file for complete search history.

(56) References Cited

U.S. PATENT DOCUMENTS 5,969,686 A    10/1999    Mackenzie
8,042,765 B1    10/2011    Nance et al.
(Continued)

FOREIGN PATENT DOCUMENTS

FR    2686981 A1    8/1993
WO    WO-2008119144 A2    10/2008
WO    WO-2012131105 A1    10/2012

OTHER PUBLICATIONS

French Search Report with English Language Translation Cover Sheet, dated Jan. 9, 2015, FR Application No. 1453516.
(Continued)

*Primary Examiner* — Christopher P Ellis
(74) *Attorney, Agent, or Firm* — Womble Bond Dickinson (US) LLP (57) ABSTRACT

The invention relates to an aircraft (5) comprising: a structure (6); a landing gear (1) mounted on the structure (6) of the aircraft; and at least one obstacle detector (2). The aircraft (5) is characterized in that the obstacle detector (2) is secured to an arm (3), said arm (3) being mounted on the structure (6) such that it can move between a rest position in which the arm (3) is retracted and a detection position in which the arm (3) is deployed such that the obstacle detector (2) extends close to a lower portion of the landing gear (1) at a distance from the structure (6) of the aircraft (5).

15 Claims, 4 Drawing Sheets

(56) References Cited

U.S. PATENT DOCUMENTS

| | | | |
|---|---|---|---|
| 8,264,377 B2* | 9/2012 | Griffith | G01S 13/931 |
| | | | 340/961 |
| 9,091,762 B2* | 7/2015 | Knight | G01S 13/93 |
| 9,196,168 B2* | 11/2015 | McCollough | G01S 13/9303 |
| 9,207,319 B2* | 12/2015 | Starr | G01S 7/04 |
| 9,223,017 B2* | 12/2015 | Khatwa | B60Q 9/008 |
| 9,469,416 B2* | 10/2016 | Barnes | B64D 47/08 |
| 9,472,109 B2* | 10/2016 | Starr | G06F 3/0484 |
| 9,783,320 B2* | 10/2017 | Barnes | B64D 47/08 |
| 9,836,661 B2* | 12/2017 | Zhou | G08G 5/0021 |
| 9,892,647 B2* | 2/2018 | Papageorgiou | G08G 5/04 |
| 2002/0081110 A1 | 6/2002 | Johnson et al. | |
| 2003/0048357 A1 | 3/2003 | Kain et al. | |
| 2005/0007257 A1* | 1/2005 | Rast | B64D 47/04 |
| | | | 340/815.45 |
| 2008/0062011 A1* | 3/2008 | Butler | G01S 3/783 |
| | | | 340/961 |
| 2010/0252678 A1* | 10/2010 | Luce | B64C 25/00 |
| | | | 244/100 R |
| 2013/0245860 A1* | 9/2013 | Cooper | B64D 45/00 |
| | | | 701/14 |
| 2013/0297102 A1* | 11/2013 | Hughes | G05D 1/0083 |
| | | | 701/3 |
| 2013/0321176 A1* | 12/2013 | Vasek | G08G 5/04 |
| | | | 340/945 |
| 2014/0062756 A1* | 3/2014 | Lamkin | G08G 5/0021 |
| | | | 342/29 |
| 2015/0106005 A1* | 4/2015 | Wischmeyer | G08G 5/065 |
| | | | 701/301 |
| 2015/0225075 A1* | 8/2015 | Renier | B64C 25/405 |
| | | | 244/50 |
| 2016/0052641 A1* | 2/2016 | Olofinboba | G08G 5/0013 |
| | | | 340/978 |
| 2016/0124428 A1* | 5/2016 | Nutaro | G05D 1/0011 |
| | | | 701/2 |
| 2016/0335899 A1* | 11/2016 | Schwartz | G08G 5/0013 |
| 2016/0351061 A1* | 12/2016 | Lamkin | G08G 5/065 |
| 2018/0075762 A1* | 3/2018 | Gadgil | G08G 5/04 |
| 2018/0096610 A1* | 4/2018 | Ray | G08G 5/04 |

OTHER PUBLICATIONS

International Search Report with English Language Translation, dated Jul. 21, 2015, PCT Application No. PCT/EP2015/058383.
Written Opinion of International Search Authority with English Language Translation, dated Oct. 18, 2016, PCT Application No. PCT/EP2015/058383.

* cited by examiner

AIRCRAFT COMPRISING A RETRACTABLE ARM EQUIPPED WITH AN OBSTACLE DETECTOR

FIELD OF THE INVENTION

The invention relates to the general field of detection of obstacles around an aircraft.

TECHNICAL BACKGROUND

These days, the main cause of accidents in an airport on traffic lanes and at boarding gates takes place during ground operations of aircraft. These accidents are generally due to collisions of the aircraft with obstacles present around it during its manoeuvres, in particular during backing manoeuvres. In fact, pilots have no visibility in areas located below and behind their aircraft.

The presence of such obstacles is dangerous for ground personnel, for the aircraft as well as for the passengers. Moreover, accidents resulting from the collision of an aircraft with obstacles have the consequence of reducing the operability of the airport, causing delays in flights and strongly perturbing the activities of airline companies.

In order to avoid collisions between an aircraft and obstacles present on the ground, it is known to escort the aircraft during its entire ground operation phase (towing, taxiing, etc.) with dedicated personnel. This personnel, especially trained for this type of assignment, guides the aircraft on the ground while anticipating the presence of obstacles. This guidance, however, the anticipation and the ability to identify possibly interfering obstacles on the runway, are limited by the fact that the personnel is human and can consequently make errors, be momentarily distracted or even have reduced visibility due to meteorological conditions. Moreover, a human being cannot physically view a field of view of 360° around the airplane. Finally, the personnel who assist in parking aircraft and in guiding pilots is required to satisfy radio communication procedures as well as maintain communication by signs with the runway personnel.

In addition, this escorting work is dangerous, tiring and stressing for the ground personnel who, in addition to obstacles present on the ground, must anticipate the movement of vehicles and of other aircraft present on the ground.

Already known, particularly from US2002/0081110, are aircraft conforming to the preamble of claim 1.

SUMMARY OF THE INVENTION

One objective of the invention is to propose a new means allowing detection of obstacles during ground operations of aircraft and to respond to the need for visibility rearward and below the aircraft, particularly during backing manoeuvres, which are more effective than conventional techniques, no matter the visibility conditions on the ground, and which in addition are automatic and independent of human reflexes.

To this end, the invention proposes an aircraft comprising:
  a structure,
  a landing gear, mounted on the structure of the aircraft, and
  at least one obstacle detector,
wherein the obstacle detector is attached to an arm, said arm being mounted on the structure so as to be movable between a rest position, in which the arm is collapsed, and a detection position, in which the arm is deployed.

The landing gear is retractable and has a retracted configuration, in which the landing gear is accommodated in a box formed in the structure, and an extended configuration, in which the landing gear is deployed, the arm being mounted in the box of the landing gear, the obstacle detector being located in proximity to a lower portion of the landing gear, distant from the structure of the aircraft, when the arm is deployed.

With such a configuration, the detector is located in immediate proximity to the landing gear. This is particularly advantageous in that the landing gear is the part most exposed to obstacle encounter, (vehicles on the ground in particular) and in that obstacles capable of striking the landing gear are not visible to the crew.

The fact of placing the detection system near the landing gear makes it possible to see what is in the direction of movement of the landing gear, avoids any parallax problems and thus allows detection of obstacles and the possibility of classifying them simply as critical or non-critical (binary test of the "is the obstacle in the movement axis of the airplane at the undercarriage level or not?" type).

Any other positioning in the fuselage or on the wings (outside the vicinity of the undercarriage) imposes a more complex evaluation (evaluation of the reciprocal positioning between the obstacle and the landing gear), which cannot be carried out with a single sensor (determination of both a direction and a distance to the landing gear for any potential obstacle is necessary).

Certain preferred but not limiting features of the aircraft are the following:
  the obstacle detector can be attached in an area at the back of the box;
  the landing gear comprises a casing, having a main direction extending along a longitudinal axis, said casing comprising a first end configured to be mounted on the aircraft, and a second end opposite to the first end, and a rod, slidably mounted on the second end of the casing, said rod being movable in translation with respect to the casing along the longitudinal axis, and, in the rest position, the obstacle detector extends in an area adjacent to the second end of the casing,
  the arm comprises a first end, mounted on the structure, and a second end, opposite to the first end, the obstacle detector being attached in an area adjacent to the second end of the arm,
  the obstacle detector is attached so as to be oriented toward a rear area of the landing gear,
  the arm passes from the rest position to the detection position only when the landing gear is in the extended configuration,
  the arm passes into the rest position when a movement speed of the aircraft is lower than a predetermined threshold speed,
  the arm is telescoping,
  the aircraft comprises at least two obstacle detectors,
  the obstacle detectors are attached together so as to form a single part,
  the obstacle detector comprises at least one, preferably at least two obstacle detectors selected from the following group: infrared proximity detector, microwave proximity detector, ultrasonic proximity detector, one or more infrared or visible cameras, an ultrasonic range finder, a radar range finder or a laser range finder,
  the aircraft further comprises an actuator configured for rotating the obstacle detector around the arm,
  the actuator is configured for rotating the arm the obstacle detector around the arm by rotating the arm, the obstacle detector comprises a detection field having an aperture and a depth configured to cover a lower area of the aircraft and a rear area of the aircraft, the aperture of the detection field has a horizontal viewing angle comprised between 0° and 270°, and a depth comprised between approximately 0 meter and approximately 250 meters, the aircraft comprises at least two obstacle detectors, each obstacle detector being attached to a respective arm mounted on the structure so as to be movable between a rest position and a detection position.

BRIEF DESCRIPTION OF THE DRAWINGS

Other features, aims and advantages of the present invention will appear more clearly upon reading the detailed description that follows, with reference to the appended drawings given by way of non-limiting example and wherein.

DETAILED DESCRIPTION OF ONE EMBODIMENT

In order to allow optimized obstacle detection and reduce the risks of collision of an aircraft 5 during operations on the ground, the invention proposes to equip the aircraft 5 with one or more obstacle detectors 2 on its undercarriage 1 (or landing gear). The obstacles thus detected by the detector(s) can then be used as input values for dedicated processing units (or if appropriate directly to the pilot of the aircraft), configured to analyze these input values and to deduce from them a safe and optimized trajectory during movement on the ground of the aircraft. For example, the processing units can prepare a map of the obstacles present around the aircraft so as to help the pilot of the aircraft to direct the aircraft. In appropriate, the processing units are also configured to process information obtained by the obstacle detectors and to optimize them (for example, when the detector 2 comprises a video camera, the images obtained need to be processed in order to take into account the differences in lighting between shadow areas and areas exposed to light).

The landing gear 1 can also comprise a main landing gear (for example located under the wings) or even an auxiliary landing gear (such as a nose landing gear, located at the nose of the aircraft 5). In the example illustrated in the figures, this is a main landing gear.

A landing gear 1 can be fixed or retractable into a dedicated landing gear 1 box 7 formed in the structure 6 (fuselage or wings) of the aircraft 5.

Hereafter, the invention will be described more particularly in the case of a retractable landing gear 1, i.e. a landing gear 1 configured to be retracted between the takeoff phase and the landing phase into a landing gear 1 box 7 of an aircraft 5, and extended during the landing phases and ground operations.

The landing gear 1 generally comprises, in a manner known per se, a casing 10, having a main direction extending along a longitudinal axis X, which constitutes the main body of the landing gear 1 and allows transmission of the main forces to the structure 6 of the aircraft 5. The casing 10 comprises, to this end, a first end 10a, mounted on the structure 6 of the aircraft 5, and a second end 10b, comprising a cavity that is not visible in which is pivotally mounted a lower portion consisting of a base 12 and a sliding rod 14.

The sliding rod 14 is movable in translation with respect to the casing 10 along the longitudinal axis X and forms, with the base 12, a damper adapted to absorb the energy of impact in landing and support the ground manoeuvres of the aircraft 5. The base 12 can be mounted in the cavity of the second end 10b of the casing 10 so that the sliding rod 14 can pivot substantially around the longitudinal axis X of the casing 10.

The end 14b of the sliding rod 14, which is farther from the second end 10b of the casing 10, supports displacement means 16, such as for example a wheel consisting of a rim.

The landing gear 1 further comprises a brace-strut 18, comprising a first end configured to be mounted on the aircraft 5 and a second end configured to be connected to the casing 10, in proximity to the second end 10b of said casing 10. The brace-strut 18 is configured to transmit to the structure 6 of the aircraft 5 the axial loads coming from the displacement means 16.

The applicant became aware that it was technically difficult to accommodate sensors such as obstacle detectors 2 on the landing gear 1, in that the detection field F of these obstacle detectors 2 must cover at least the area extending below the aircraft 5 and the area extending to the rear of the aircraft 5 (in the direction of the tailplane and beyond). Optionally, it can also be useful for the obstacle detectors 2 to be capable of covering the forward area (toward the nose) of the aircraft 5.

Moreover, the performance of the obstacle detectors 2 must not be impaired due to hitting an object when the aircraft is rolling at high speed on the runway, or due to meteorological conditions (snowflakes, raindrops, hail, etc.) or particles present in the environment (dust, smoke, pollution, etc.).

It will also be noted that the position, the orientation and the selection of the obstacle detectors 2 must take into account the extent of the area that it is desired to monitor, the intrinsic detection field of the selected obstacle detector (aperture and depth of field), as well as the sensitivity of each detector (to lighting in particular, which is generally lower below the aircraft than around it, which can cause problems for some types of detectors).

These difficulties are further increased due to the retractable nature of the landing gear 1. In fact, in the extended configuration of the landing gear 1, the obstacle detectors 2 must be oriented in the direction for detecting obstacles. In addition, in the retracted configuration, the obstacle detectors 2 must be able to be accommodated in the structure 6 of the aircraft 5, the available volume whereof is sharply limited.

So as to meet all the requirements cited above, the obstacle detector 2 is attached to an arm 3, mounted on the structure 6 of the aircraft, which is movable between a rest position in which it is collapsed, and a detection position, in which it is deployed so as to position the obstacle detector 2 in the lower portion of the landing gear 1, at a distance from the structure 6 of the aircraft 5 and from the ground. In the detection position, the obstacle detector 2 then extends into an area adjacent to the second end 10b of the casing 10, which makes it possible to obtain a large detection field F. In fact, by positioning the obstacle detector 2 in this manner, the detection field F of the detector 2 is not hindered by the structure 6 (fuselage or wing, depending on the position of the detector 2) of the aircraft 5. In addition, the obstacle detector 2 being at a distance from the ground, its detection field F is not limited by the presence of the ground and the risk that it may enter into collision with objects present on the ground or projected during movement of the aircraft 5 are strongly reduced.

The obstacle detector 2 can be started so as to detect the presence of possible obstacles around the aircraft 5 when the arm 3 is in the detection position, and shut down when the arm 3 is in the rest position.

The arm 3 has a main body 30, extending in a main direction defining a longitudinal axis Y of the arm 3 and comprising a first end 30a, configured to be mounted on the structure 6 of the aircraft, and a second end 30b, opposite to the first end 30a.

In the detection position, the body of the arm 3 can extend substantially vertically, i.e. in the direction of the ground and substantially parallel to the longitudinal axis X of the casing 10. The obstacle detector 2 can then be attached at the second end 30b of the arm 3, so as to extend below the body 30 of the arm 3 when it is in its detection position.

The arm 3 can be telescoping, so that the distance between the first 30a and the second 30b end of the body 30 of the arm 3 is variable. In this embodiment, the rest position of the telescoping arm 3 then corresponds to a retracted position, while its detection position corresponds to a deployed position. The distance between the first 30a and the second 30b end is therefore shorter in the rest position than in the collapsed position of the telescoping arm 3.

As a variant, the arm 3 can be pivoting and be rotatably mounted at its first end 30a on the structure 6 of the aircraft 5 using a pivoting type attachment. In this alternative embodiment, the distance between the first 30a and the second 30b end of the arm 3 is therefore fixed. Moreover, in the rest position of the pivoting arm 3, the arm 3 can be in a substantially horizontal position, then move to a substantially vertical position in the detection position by rotation around the pivot link.

According to yet another variant, the arm 3 can be both telescoping and pivoting.

The arm 3 can be mounted on the aircraft 5, in the box 7 of the landing gear 1.

The arm 3 can then be collapsed into the box 7 of the landing gear 1 when it is in the rest position and deploy when the landing gear 1 is in its extended configuration so as to come into the detection position.

The box 7 of the landing gear 1 then makes it possible to protect the arm 3 and the obstacle detector 2, in particular during flight phases. This configuration further makes it possible to not affect the aerodynamic properties of the aircraft 5 when the arm is in its rest position.

The position of the arm 3 in the box 7 can in particular be selected according to the accuracy of detection and the detection field F of the obstacle detector 2 as well as the geometry of the landing gear 1 and of its landing box 7 (space available in the box 7, kinematics of extension and retraction, etc.). It can in particular be advantageous to offset the arm 3 toward the back of the box 7 (i.e. as close as possible to the tailplane of the aircraft 5) so as to optimize the detection field F of the detector 2, in particular when it is desired to visualize, using the detector the underside and rear areas of the aircraft 5, and to reduce the areas masked off (in particular by the presence of the landing gear 1). In addition, the position of the arm 3 in the box 7 is selected so that the arm does not interfere during extension or retraction of the landing gear 1 into the box 7. Thus, the first end of the arm 3 can for example be positioned in the area extending between the wheel and the brace-strut of the landing gear 1 when the landing gear is retracted into the box 7.

The position of the obstacle detector 2 on the arm 3 can also be determined depending on the accuracy of detection and of the detection field F of the obstacle detector 2, as well as the geometry of the landing gear 1 and the position of the arm 3 in the landing box 7.

In one embodiment, the arm 3 moves from its rest position to its detection position only when the landing gear 1 is in its extended configuration. The arm 3 thus remains collapsed in the rest position and protects the obstacle detector 2 as long as the landing gear 1 is in the retracted configuration.

Optionally, the arm 3 can be controlled by the speed of movement of the aircraft 5, to avoid the obstacle detector 2 being struck by an object, for example an object present on the runway, or meteorological conditions (rain, snow, etc) hampering the detection of obstacles by the detector 2. In this alternative embodiment, the arm 3 can enter its detection position only when the following two cumulative conditions are satisfied:

The landing gear 1 is in its extended configuration, and

The speed of the aircraft 5 is less than a predetermined threshold speed.

These cumulative conditions thus allow protecting the obstacle detector 2 and not prematurely deploying the arm 3.

When appropriate, the obstacle detector 2 can also be protected from its environment (bad weather, wind, etc.) using a protective shield, for example by a protective cap or by the support 3 of the detector 2.

The aircraft 5 can further comprise a control unit, adapted to control the arm 3 and the obstacle detector 2. In particular, the control unit can be configured to cause the arm 3 to move from its rest position to its detection position when the corresponding condition(s) (extended configuration of the landing gear and, if appropriate, speed of the aircraft 5 less than the predetermined threshold speed) are satisfied. Moreover, the control unit can control starting (respectively extinction) of the obstacle detector 2 when the arm 3 is in its detection position (respective rest position).

The control unit can in particular be accommodated directly in the arm 3, for example in the body 30 of the arm 3. Moreover, the arm 3 can be equipped with the set of connection and power supply cables of the detector(s). In this manner, it is sufficient to attach the arm 3 to the structure 6 of the aircraft and to connect the cables of the detectors to the existing array of cables of the aircraft 5 to install the arm 3 and the obstacle detector 2.

The control unit can further be configured to transmit information collected by the obstacle detector 2 to the dedicated processing units, so as to define a safe and optimized trajectory during ground movements of the aircraft 5.

According to one embodiment, the landing gear 1 can comprise several obstacle detectors 2, for example two obstacle detectors 2, so as to improve the detection of obstacles, reduce the noise which can be caused by external conditions (particularly by meteorological conditions) and compensate for any possible malfunction of one of the obstacle detectors 2. The two obstacle detectors 2 can then be identical (same detection technology and/or same detection accuracy) or different.

For example, the landing gear 1 can comprise at least one, preferably two obstacle detectors 2 selected from the following group: a proximity detector (infrared, microwave, ultrasound, etc.), one or more cameras (infrared or visible—single or stereo artificial vision, etc.), a range finder (ultrasonic, radar or laser range finder), etc.

In the case of an obstacle detector 2 comprising a camera, the images transmitted by the camera can further contribute to the collection of information which can help in guiding or piloting the aircraft 5, with registering the position of the aircraft 5 with respect to marks on the ground or to panels placed on the edges of the traffic routes, etc.

The aircraft 5 can further comprise several arms 3, each equipped with at least one obstacle detector 2. For example, the aircraft 5 can comprise a first arm 3 mounted in proximity to a main landing gear 1 and to which are attached one or more obstacle detectors 2, and a second arm 3 mounted in proximity to an auxiliary landing gear 1 and to which are attached one or more obstacle detectors 2.

The implementation of several arms 3 for attaching obstacle detectors makes it possible to obtain several distinct viewpoints and thus to enlarge the obstacle detection field, to improve the accuracy of measurements carried out by the different obstacle detectors and to reduce possible blind spots as well as the impact of meteorological conditions on the measurements carried out.

Figure 1:
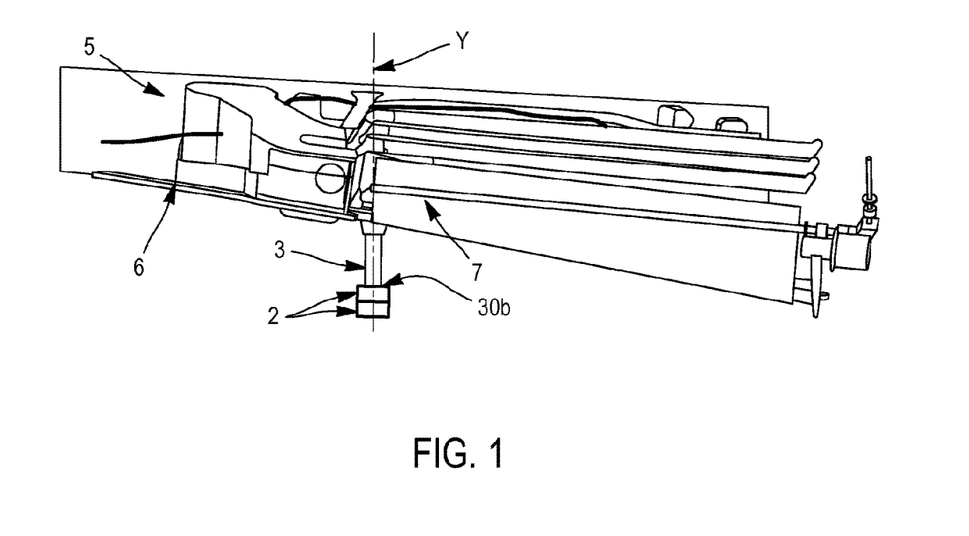
FIG. 1 illustrates a schematic view of a portion of an exemplary embodiment of an aircraft conforming to the invention, wherein the arm is in the detection position.
Figure 2:
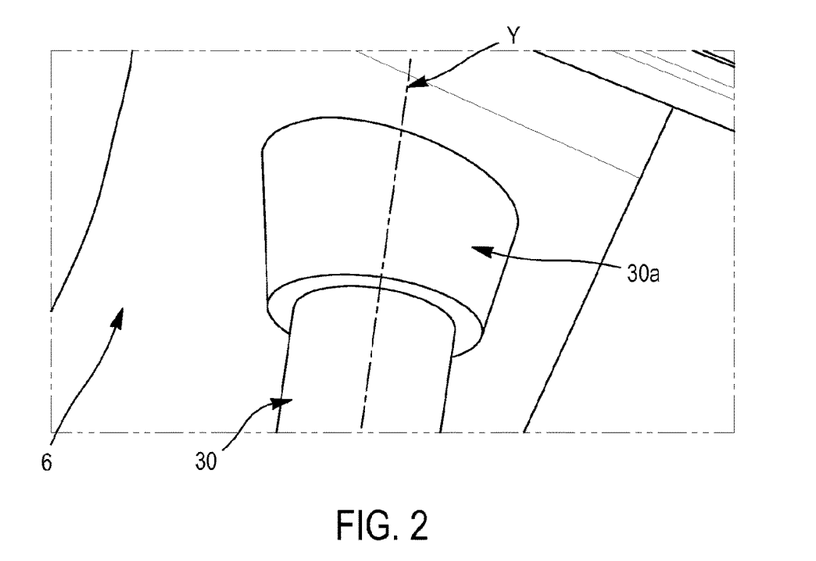
FIG. 2 is a detail view of a portion of an exemplary embodiment of an arm supporting an obstacle detector for an aircraft conforming to the invention.
Figure 3:
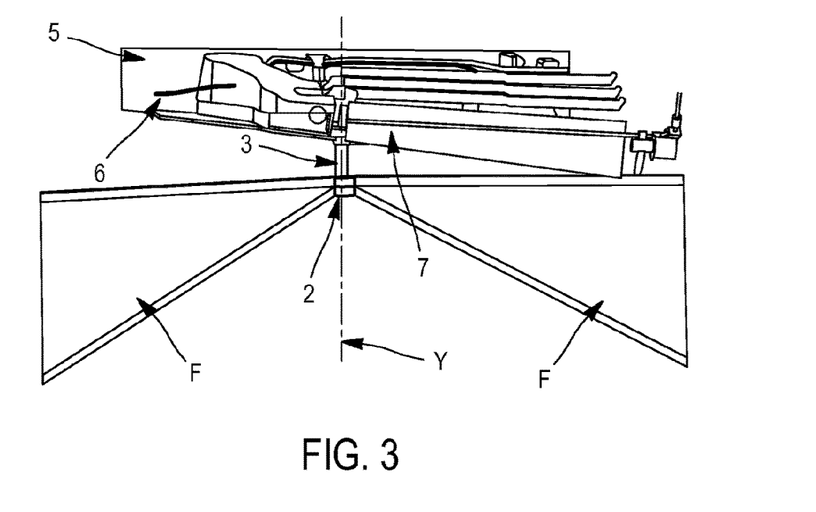
FIG. 3 illustrates the detection field of the detector of the aircraft of FIG. 1.
Figure 4:
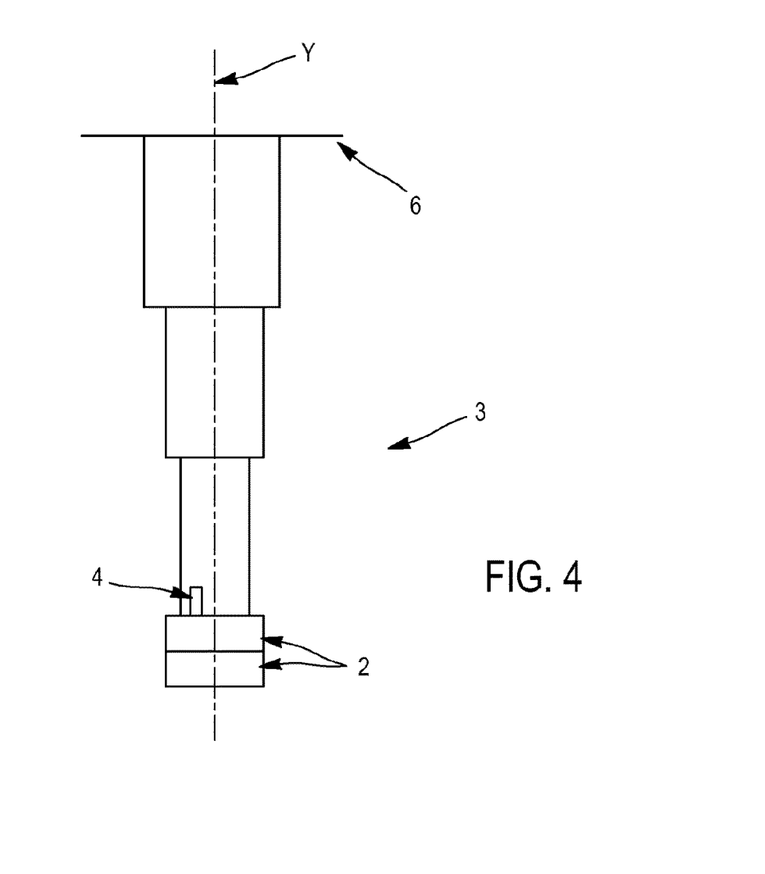
FIG. 4 is a view in longitudinal section of an exemplary embodiment of an arm.
Figure 5:
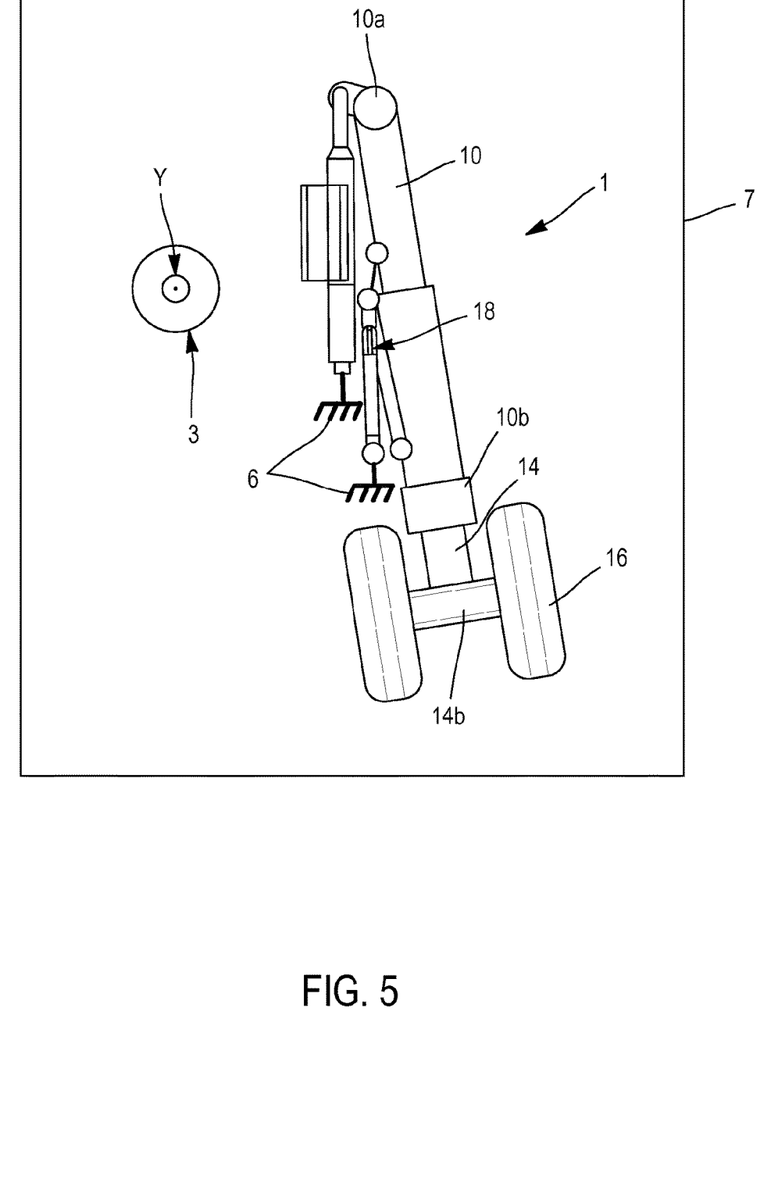
FIG. 5 is a schematic view of an exemplary embodiment of a box of an aircraft conforming to the invention, on which are visible a landing gear in the retracted configuration and an arm in the rest position.
Figure 6:
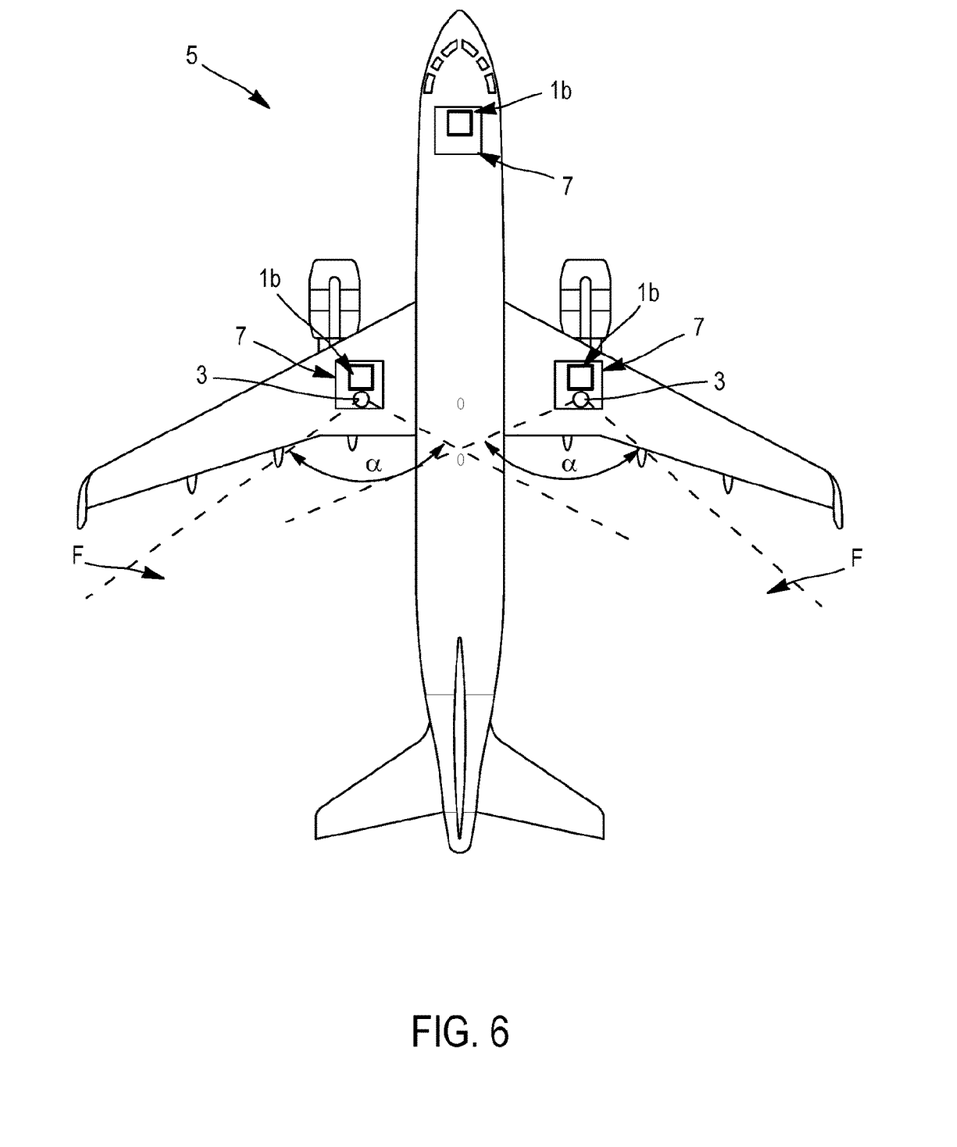
FIG. 6 illustrates an example of arm positioning on an example of aircraft comprising a nose landing gear and two main landing gears, and examples of associated detection fields.

For example, an example of positioning of an arm 3 equipped with obstacle detectors 2 is illustrated in FIG. 6, on an example of an aircraft 5 comprising two main landing gear 1a attached at its wings and a nose landing gear 1b attached under the nose of the aircraft 5. It will be understood that the invention is not limited to this type of aircraft, and can just as well apply to aircrafts 5 comprising a different number of landing gears 1. The position and the orientation of the arms 3 and of the obstacle detectors 2 are then adapted depending on the type of aircraft 5 and the number of landing gears.

In this exemplary embodiment, the arms 3 are attached to a rear portion of the box 7 of the main landing gears 1a, their respective detectors 2 being oriented toward the rear of the aircraft 5. Here the aircraft 5 does not comprise an obstacle detector 2 at its nose landing gear 1b. It will be of course be understood that the aircraft could, as a variant, comprise a supplementary arm attached in the box 7 of the nose landing gear 1b. Thanks to this position and to this orientation, not only can the obstacle detectors 2 be accommodated in a free space in the box 7 of their respective landing gear 1a while still observing the kinematics of the landing gear 1a during its extension or its retraction, but in addition the detection field F of the detectors 2 allows coverage of an important portion of the area extending below the aircraft 5 and behind it. Moreover, this position of the obstacle detectors 2 allows obtaining considerable coverage of their respective detection field F in the area subjacent to the aircraft 5.

The obstacle detector 2 is preferably selected so as to have an optimum detection field F for a small dimension, so as to obtain good detection performance and to reduce the use of space of the arm 3, in particular when the arm 3 is collapsed in the rest position. It is then unnecessary to modify the structure 6 of the aircraft 5 to receive the collapsed arm 3, particularly when the arm 3 is accommodated in the box 7 of the landing gear 1.

Preferably, the obstacle detector 2 is selected so as to have a detection field F capable of covering a lower area and a rear area of the aircraft 5. For example, the aperture of the detection field can have an angle $\alpha$ comprised between 0° and 270°, and a depth comprised between approximately 0 meter and approximately 250 meters. Such a detector 2 is then capable of detecting with sufficient accuracy obstacles in the environment of an aircraft 5. Moreover, current technology makes it possible to make obstacle detectors 2 having such performance with small size.

In one embodiment, the landing gear 1 can comprise and actuator 4 configured to rotate the obstacle detector 2 around the longitudinal axis Y of the arm 3. The implementation of such an actuator 4 thus allows the detector 2 to enlarge the angle $\alpha$ of its detection field F by performing a sweep of the surrounding area. The detector 2 can thus detect obstacles over 360° around the longitudinal axis Y of the arm 3, even if the initial range a of the detection field F of the obstacle detector 2 is less than 360°.

The actuator 4 thus allows a reduction in the dimensions of the obstacle detector 2, and therefore its bulk, by reducing the detection field required for the detector 2.

According to a first embodiment, the actuator 4 can be configured to rotate the obstacle detector 2 around the axis Y of the arm 3, the arm 3 remaining fixed with respect to the structure 6 of the aircraft 5.

As a variant, according to a second embodiment, the actuator 4 can rotate the arm 3 around its longitudinal axis Y, the obstacle detector 2 remaining fixed with respect to said arm 3.

When the landing gear 1 comprises several obstacle detectors 2, at least two obstacle detectors 2 can be attached together so as to form a single part. For example, all or part of the obstacle detectors 2 can be attached by means of a common support.

As a variant, the obstacle detectors 2 can be attached separately to the arm 3. If appropriate, each obstacle detector 2 can be associated with a corresponding actuator 4. The obstacle detectors 2 can then be set into motion independently from one another by means of their respective actuator 4.

The attachment of the obstacle detectors 2 to a collapsible arm 3 makes it possible to guarantee the proper positioning of the obstacle detectors 2, even if the landing gear 1 is retractable. The position of the obstacle detectors 2 is in fact independent of that of the landing gear 1. Moreover, the optional presence of actuators 4 allow the obstacle detectors 2 to sweep a large detection field F, and to guarantee complete vision forward, rearward and to the sides of the aircraft 5.

In addition, the addition of an arm 3 requires only minimal modifications of the structure 6 of known aircrafts 5. The control unit and the connection and power supply cables of the detector(s) can in fact be accommodated in the arm 3. It is therefore easy to upgrade existing aircrafts 5 so as to equip them with obstacle detectors 2.

The invention claimed is:

1. An aircraft comprising:
a structure, a landing gear, mounted on the structure of the aircraft, and at least one obstacle detector, wherein the obstacle detector is attached to an arm, said arm being mounted on the structure so as to be movable between a rest position, in which the arm is collapsed, and a detection position, in which the arm is deployed, wherein the landing gear is retractable and has a retracted configuration, and an extended configuration and in the retracted configuration, the landing gear is disposed in a box formed in the structure, and in the extended configuration, in which the landing gear is deployed, the arm is mounted in the box, and the obstacle detector is located in proximity to a lower portion of the landing gear distant from the structure of the aircraft, when the arm is deployed.

2. The aircraft according to claim 1, wherein the landing gear comprises:
- a casing, having a main direction extending along a longitudinal axis, said casing comprising a first end configured to be mounted on the aircraft, and a second end opposite to the first end,
- a rod, slidably mounted on the second end of the casing, said rod being movable in translation with respect to the casing along the longitudinal axis (X), and wherein, in a rest position, the obstacle detector extends in an area adjacent to the second end of the casing.

3. The aircraft according to claim 1, wherein the arm comprises a first end, mounted on the structure, and a second end, opposite to the first end, the obstacle detector being attached in an area adjacent to the second end of the arm.

4. The aircraft according to claim 1, wherein the obstacle detector is attached so as to be oriented toward a rear area of the landing gear.

5. The aircraft according to claim 1, wherein the arm passes from the rest position to the detection position only when the landing gear is in the extended configuration.

6. The aircraft according to claim 1, wherein the arm passes into the rest position when a movement speed of the aircraft is less than a predetermined threshold speed.

7. The aircraft according to claim 1, wherein the arm is telescoping.

8. The aircraft according to claim 1, comprising at least two obstacle detectors.

9. The aircraft according to claim 8, wherein the obstacle detectors are attached together so as to form a single part.

10. The aircraft according to claim 1, wherein the obstacle detector comprises at least one obstacle detector selected from the following group: infrared proximity detector, microwave proximity detector, ultrasonic proximity detector, one or more infrared or visible cameras, an ultrasonic range finder, a radar range finder and a laser range finder.

11. The aircraft according to claim 1, further comprising an actuator configured to rotate the obstacle detector around the arm.

12. The aircraft according to claim 11, wherein the actuator is configured for rotating the obstacle detector around the arm by rotating of the arm.

13. The aircraft according to claim 1, wherein the obstacle detector comprises a detection field having an aperture and a depth configured to cover a lower area of the aircraft and a rear area of the aircraft.

14. The aircraft according to claim 13, wherein the aperture of the detection field has a horizontal viewing angle between 0° and 270°, and a depth approximately 0 meter and approximately 250 meters.

15. The aircraft according to claim 1, comprising at least two obstacle detectors, each obstacle detector being attached to a respective arm mounted on the structure so as to be movable between a rest position and a detection position.

* * * * *